(12) United States Patent
Corn et al.

(10) Patent No.: US 7,160,060 B1
(45) Date of Patent: Jan. 9, 2007

(54) SYSTEM AND METHOD OF REMEDIATION OF CONTAMINANTS

(75) Inventors: Michael R. Corn, Brentwood, TN (US); Luke G. Patterson, Nashville, TN (US)

(73) Assignee: AquAeTer, Inc., Brentwood, TN (US)

(*) Notice: Subject to any disclaimer, the term of this patent is extended or adjusted under 35 U.S.C. 154(b) by 0 days.

(21) Appl. No.: 11/397,117

(22) Filed: Apr. 4, 2006

Related U.S. Application Data

(62) Division of application No. 10/877,508, filed on Jun. 25, 2004, now abandoned.

(51) Int. Cl.
*B09C 1/08* (2006.01)
(52) U.S. Cl. .................................. 405/128.75
(58) Field of Classification Search ........... 405/128.75, 405/128.5
See application file for complete search history.

(56) References Cited

U.S. PATENT DOCUMENTS

| | | | | |
|---|---|---|---|---|
| 5,507,953 | A | * | 4/1996 | Machlitt et al. ............. 210/634 |
| 6,447,207 | B1 | * | 9/2002 | Ivey ....................... 405/128.25 |
| 6,740,238 | B1 | * | 5/2004 | Schindler ................ 405/128.45 |
| 2002/0082348 | A1 | * | 6/2002 | Okuno et al. ................ 525/107 |

OTHER PUBLICATIONS

"Studies of Naphthalene and Toluene Metabolism in Rhodococcus" by Lía-Cristina Rodríguez, vol. 4, Massachusetts Institute of Technology, 2000.
"The Groundwater Pollution and Hydrology Course" by John A. Cherry and Robert W. Cleary, Princeton Groundwater, Inc., 2004.
LARC "Monographs on the Evaluation of the Carcinogenic Risk of Chemicals to Man".
Horvath, A.L. et al; "Journal of Physical and Chemical Reference Data", vol. 28: 449 (1999).
Flick, E.W. "Industrial Solvents Handbook", p. 116, 3rd ed. Park Ridge, NJ: Noyes Publications, 1985.
Delassus, P.T., Schmidt, D.D.; "J Chem Eng Data", 26: 274-6 (1981).
May, W.E., et al., "J. Chem Ref Data", 28: 197-0200 (1983).
Sanemasa, I., et al; "Bull Chem Soc Japan", 55: 1054-1230 (1982).
Patty, F. (ed.). "Industrial Hygiene and Toxicology: vol. II: Toxicology", 2nd ed. New York: Interscience Publishers, 1963. 1223.
Yalkowsky, S.H., Dannenfelser, R.M.; "The Aquasol Database of Aqueous Solubility", 5th ed., Tucson, AZ: Uniz AZ, College of Pharmacy (1992).
Pearlman, R.S., et al: "J Chem Ref data" 13:555-562 (1984).
Boyd, R.H. et al; "J Am Chem Soc." 87: 3554-9 (1965).
Mackay, D., Shiu, W.Y; "J Chem Eng Data"; 22:399-402 (1977).
Wise, S.A., et al., "J Chromatographic Science", 19:457-465.

* cited by examiner

*Primary Examiner*—John Kreck
(74) *Attorney, Agent, or Firm*—Waddey & Patterson; James R. Cartiglia (57) ABSTRACT

The present invention discloses a remediation system and method of use thereof for degrading contaminants, including chlorinated organics, volatile organic chemicals, and polycyclic aromatic hydrocarbons. The system includes an oxygen source and pentane. The system provides an accelerated rate of remediation as compared to currently available remediation systems.

18 Claims, 7 Drawing Sheets

SYSTEM AND METHOD OF REMEDIATION OF CONTAMINANTS

This is a divisional application which claims benefit of co-pending U.S. patent application Ser. No. 10/877,508 filed Jun. 25, 2004, entitled "System and Method of Remediation of Contaminants," now abandoned the disclosure of which is hereby incorporated by reference herein.

BACKGROUND OF THE INVENTION

The present invention relates generally to a system for remediation and a method of remediation of a contaminant, for example, chlorinated organics, volatile organic chemicals, and polycyclic aromatic hydrocarbons. The invention advantageously provides mechanisms to improve the degradation of chemicals with one or more carbon double bonds.

Remediation of subsurface contaminants has always been a difficult undertaking in the past years for a variety of reasons. The presently available remediation systems and methods of use thereof, which are standards in the industry, have several limitations and disadvantages. The primary disadvantage of the currently existing remediation systems is the extraordinarily lengthy period of time required to achieve decontamination.

Contaminants such as chlorinated organics, for example, perchloroethylene, trichloroethylene, dichloroethylene, and vinyl chloride, provide chemical structures which may provide health and environmental hazards if not safely removed from the environment. Accordingly, achieving an expeditious remediation of such contaminants is highly desirable. It is also advantageous to accomplish such remediation in a cost efficient manner.

In this regard, development of a remediation system and method of use thereof having improved properties is desirable because of the relief of the disadvantages associated with the current remediation systems. However, development of a remediation system and method has been a challenging endeavor. Moreover, the development of a remediation method producing reliable decontamination, particularly involving perchloroethylene, has been elusive.

SUMMARY OF THE INVENTION

The present invention provides a system for remediation, methods for remediation, and compositions within the remediation system. Each inventive composition includes an oxygen source and pentane. The present invention further includes a system including the composition, which is a liquid, an injection point, and monitoring point. The liquid includes an oxygen source, contaminated groundwater, and pentane, wherein the liquid has from about 10 ppm to about 1 ppm of an oxygen, and from about 0.800 ppm to about 0.010 ppm of pentane. The injection point is for injecting the oxygen source and the pentane into the contamination site. The monitoring point is for monitoring the amount of contamination as that amount changes during the remediation process.

Also disclosed is an inventive method of remediation of a contaminant, the method including providing an oxygen source, providing pentane, injecting the oxygen source and the pentane into the ground, the ground having a ground contamination site, delivering the oxygen source, the pentane, and the nutrients to the ground contamination site, and monitoring the amount of the contaminant in the ground contamination site. In certain embodiments in the present invention, at the contamination site, the ratio of oxygen to the pentane is from about 25:1 to about 200:1; from about 200:1 to about 75:1; from about 125:1 to about 75:1; or about 100:1. In alternate embodiments, oxygen may be present at a concentration from about 10 parts per million (ppm) to about 1 ppm; or from about 10 ppm to about 8 ppm. In other embodiments of the present invention, the concentration of pentane is from about 0.800 ppm to about 0.010 ppm; from about 0.200 ppm to about 0.019 ppm; from about 0.019 ppm to about 0.010 ppm. In certain embodiments, the oxygen source may be hydrogen peroxide.

The present invention also includes a method of remediation of a contaminant including injecting the hydrogen peroxide and the pentane into the ground, the ground having a ground contamination site, delivering the hydrogen peroxide and the pentane to the ground contamination site, and monitoring the amount of the contaminant in the ground at the contamination site, wherein the concentration of oxygen is from about 10 ppm to about 1 ppm oxygen and the concentration of pentane is from about 0.800 ppm to about 0.010 ppm. In certain embodiments, the ground contamination site is brought to an aerobic environment. The methods of remediation provided in the present invention are highly desired for contaminants such as chlorinated compounds, volatile organic chemicals, and polycyclic aromatic hydrocarbons. In certain embodiments, the contaminants may be 2-methylnaphthalene, naphthalene, acenaphthylene, acenaphthene, fluorene, phenanthrene, anthracene, fluoranthene, pyrene, benzo(a)anthracene, chrysene, benzo(b)fluoranthene, benzo(k)fluoranthene, benzo(a)pyrene, dibenz(a,h) anthracene, benzo(g,h,i)perylene. In alternate embodiments, the contaminants may be perchloroethylene, trichloroethylene, 1,2-cis dichloroethylene, 1,2-trans dichloroethylene, vinyl chloride. In still other embodiment, the contaminants may be benzene, toluene, ethylbenzene, xylenes, o-xylene isomer, p-xylene isomer, m-xylene isomer.

In yet another embodiment of the present invention, a method of remediation of a contaminant includes identifying a contamination site, injecting the oxygen and the pentane into the ground, the ground having a contamination site, delivering the oxygen and the pentane to the contamination site, and monitoring the site of the contaminant in the contamination site, wherein the concentration of oxygen is from about 10 ppm to about 8 ppm, and the concentration of pentane is from about 0.800 ppm to about 0.010 ppm. In certain embodiments, the step of identifying the contamination site further includes identifying a contamination site having a concentration of the contaminant in a soluble range of the contaminant.

Accordingly, one advantage of the present invention is to provide a composition having improved remediation properties.

Another advantage of the present invention is to provide a remediation system having a highly desirable and enhanced ability to modify chemicals with one or more carbon double bonds.

Still another advantage of the present invention is to provide a method of remediation which is highly desirable for contaminants such as chlorinated organics, volatile organic chemicals, and polycyclic aromatic hydrocarbons.

DETAILED DESCRIPTION OF THE PREFERRED EMBODIMENTS

The present invention provides a system for remediation, and methods of remediation of contaminants. The system disclosed herein has superior remedial properties with regard to chemicals with one or more carbon double bonds. Such systems and methods are highly desirable for the remediation of chemical contaminants. Contaminants include, but are not limited to, chlorinated organics, volatile organic chemicals, and polycyclic aromatic hydrocarbons.

One exemplary system of the present invention is formed from an oxygen source and pentane. The oxygen source may be hydrogen peroxide, such as 3% hydrogen peroxide, 35% hydrogen peroxide, or other percentage. Alternatively, other oxygen sources which are equivalent to hydrogen peroxide may also be used. Hydrogen peroxide is widely commercially available. Pentane is well known in the art and widely commercially available. These supplies and distilled water are commercially available, for example, from Spectrum Chemical of 755 Jersey Avenue, New Brunswick, N.J. 08901, or LabChem Inc., of 200 William Pitt Way, Pittsburgh, Pa. 15238.

Figure 1:
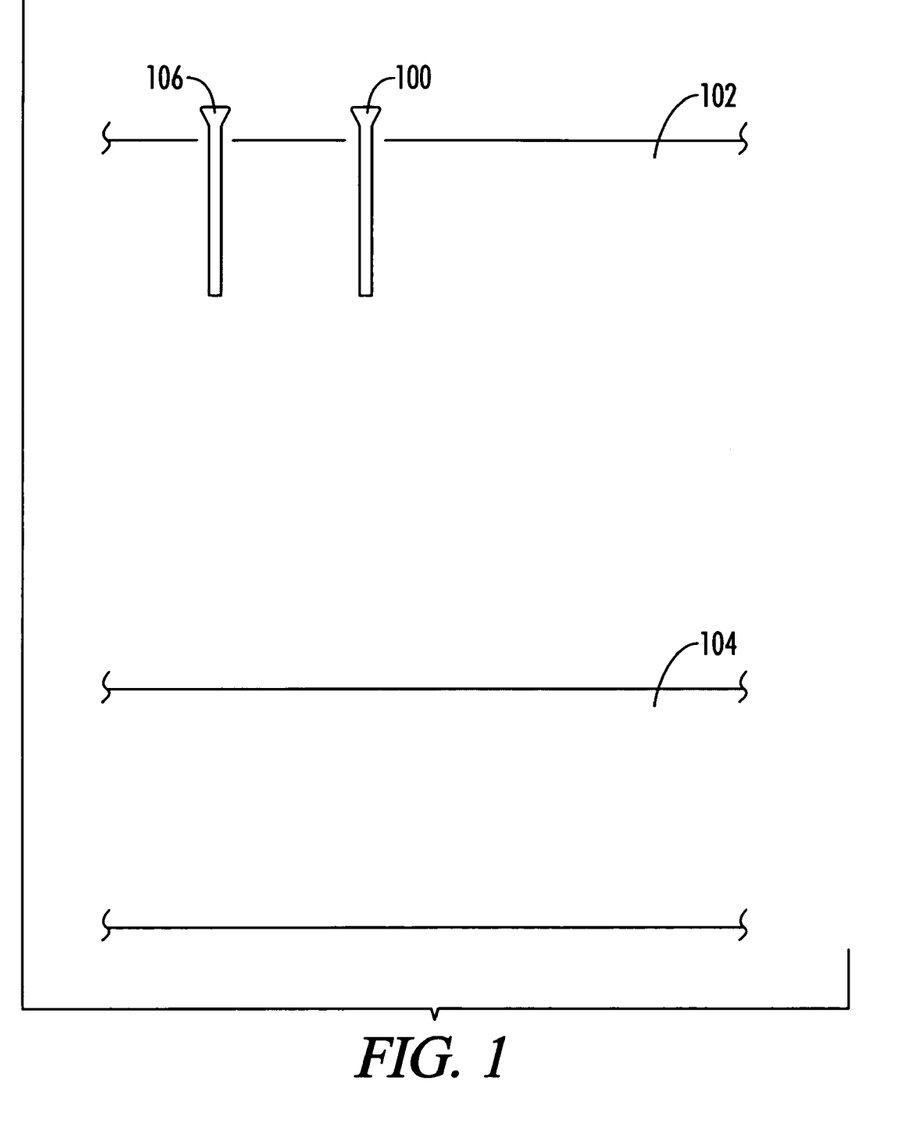
FIG. 1 is a cross section of the ground showing an injection point 100, the ground 102, and a ground contamination site 104. Also shown in FIG. 1 is the delivery route of the oxygen source and pentane. Also shown is a monitoring point 106 for monitoring a contaminant during the remediation process.

In addition to an oxygen source and a pentane source, the system of the present invention may further include an injection point, or injection well, for injecting the oxygen source and the pentane into the ground. Shown in FIG. 1 is an injection well 100, also known as an injection point, for injecting an oxygen source and pentane into the ground 102. As seen in FIG. 1, after injecting the oxygen source and pentane, they are delivered to the ground contamination site 104 by gravity and other forces, for example groundwater flow. Stated another way, delivery of the oxygen source and pentane may occur due to gravity pulling the liquids to the ground contamination site 104. The injection point may include standard remedial hardware, such injection wells are well known in the industry and commercially available, for example from Tri-State Drilling and Testing, Chattanooga, Tenn. In alternate embodiments, the oxygen source and pentane may be injected into the ground by creating a boring, or hole, in the ground in the vadose zone and pouring the oxygen source and pentane into the boring, which is the injection point. For example, an injection point having a diameter of approximately one inch and a depth of approximately three feet may be obtained by using a post driver to insert rebar or other piping into the ground. After insertion, the piping is removed to empty the hole, which is the injection point. In other embodiments, a conventional well, constructed of PVC piping having a diameter of approximately two inches or greater may be used. Injection of the oxygen source and pentane may be by continuous feed, or by daily, weekly, or bi-weekly additions of a specific volume to a well. A continuous treatment system may consist of valve systems, electrical sources, water sources, storage containers, associated piping networks, and proper supply and ratio of chemicals needed. A non-continuous treatment system may consist of chemically (and intrinsically) safe mixing areas, compatible mixing containers, and proper supply and ratio of chemicals needed. Several examples follow hereinafter.

Figure 2:
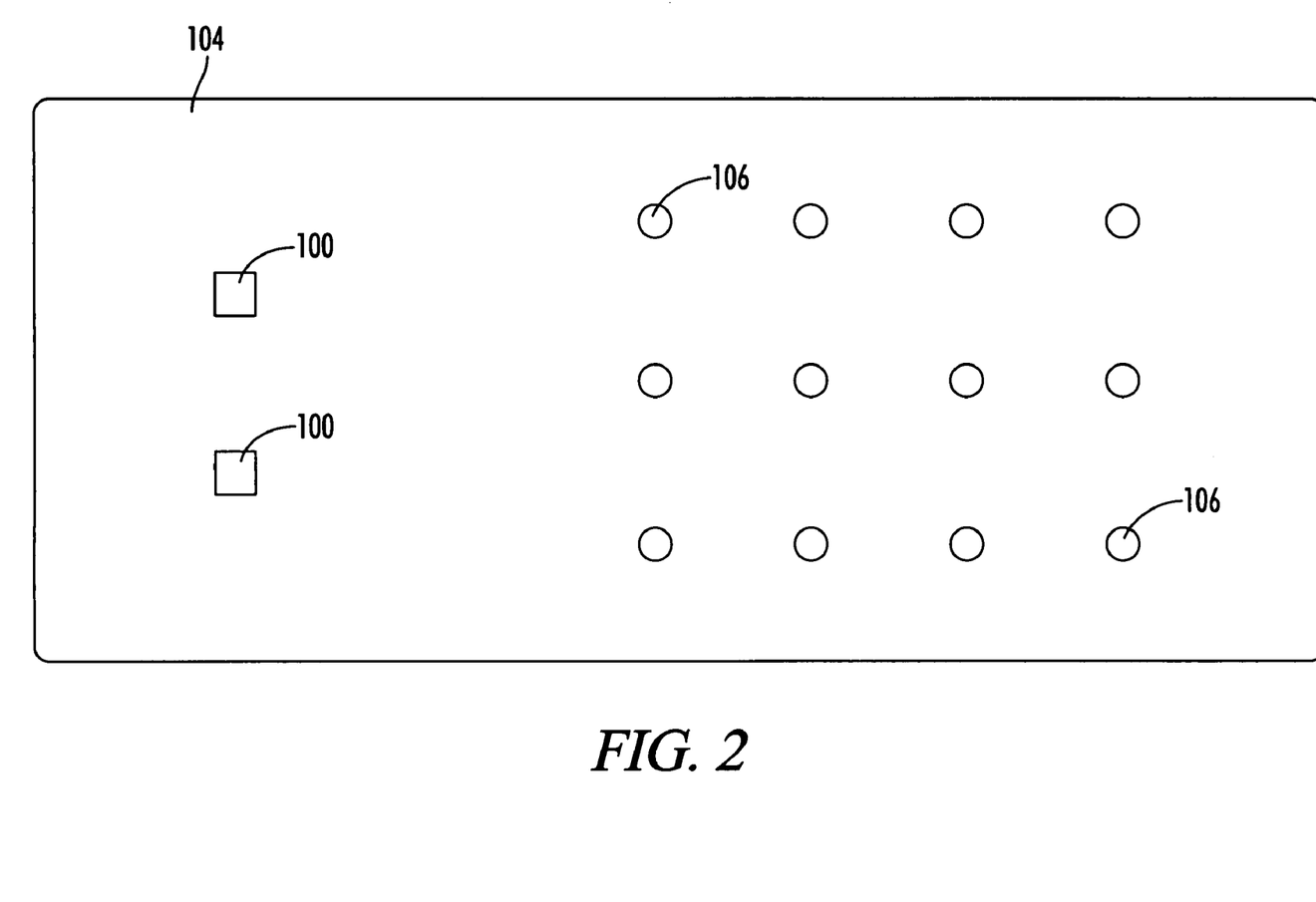
FIG. 2 is a top view of a ground contamination site 104. The figure shows multiple monitoring points 106 and multiple injection points 100.

The system may also include a monitoring point, or monitoring well, for monitoring the level of a contaminant. Monitoring well 106 is shown in FIGS. 1 and 2. Methods of identifying preferred locations of monitoring points are well known in the industry. The local site geology and hydrogeology (as well as physical obstruction) are factored into determining the installation of the most appropriate treatment and monitoring locations. Methods may include conventional groundwater well installation with a hollow stem auger (typically involves installing a two or four inch well), direct push technology (typically involves installing a one or two inch well), but can also be as simple as using a fence post driver to drive a one inch solid metal bar into the ground three or four feet (then removing that bar and leaving a small hole in the ground). The hardware associated with a monitoring point is well known in the industry and commercially available for example from Tri-State Drilling and Testing of 6228 Bonny Oaks Dr., Chattanooga, Tenn. 37416. Before the sub-surface is penetrated, an underground utility identification may be performed, as known by those of skill in the art. During or after the installation of the monitoring wells, the site may be surveyed to generate a map to use as a reference tool. In certain embodiments, a conventional well, constructed of PVC piping having a diameter of approximately one to four inches may be used. Monitoring the levels of a contaminant may also require sampling via the monitoring wells. Depending upon the type of contaminant being monitored, various pumps or bailers may be used. Sampling equipment is well known in the art and commercially available, for example, from W.L. Gore & Associates, Inc. of 100 Chesapeake Blvd., Elkton, Md. 21922. For example, if a volatile chemical is being monitored, then a low flow bladder style pump, commercially available from Geotech Environmental Equipment Inc., of 8035 East $40^{th}$ Avenue, Denver, Colo. 80207, or a bailer may be used. In alternate embodiments, if a non-volatile chemical is being monitored, then a peristaltic pump, commercially also available from Geotech Environmental Equipment Inc., Denver, Colo., may be used. It is also proper to consider the chemical nature of the contaminant, for example whether it floats or sinks, when determining the manner by which to pull a sample.

With respect to the contaminants which may be the subject of remediation, the system for remediation and methods disclosed herein should decontaminate a wide spectrum of contaminants. Remediation of chemical contaminants having one or more carbon double bonds is within the scope of this invention. Identifying a ground contamination site may include sampling groundwater from a well. In certain embodiments, the invention treats contaminants such as chlorinated organics. By way of illustration, but not limitation, examples of chlorinated organics include the constituents identified on Table 1.

In alternate embodiments, the invention should treat volatile organic chemicals. By way of illustration, but not limitation, examples of such organic chemicals include the constituents listed on Table 2.

In still other embodiments, the invention treats contaminants such as polycyclic aromatic hydrocarbons (PAH). By way of illustration, but not limitation, examples of PAHs include the constituents listed on Table 3. As described in more detail below, a contamination site which is the subject of remediation should have a concentration of a contaminant in a soluble range for that contaminant. The solubility range of chlorinated organics, volatile organics, and polycyclic aromatic hydrocarbons is dependent upon each individual member and may be easily identified within the art.

Prior to injection, the oxygen source maybe mixed with the pentane. The volume of the oxygen source and pentane to be added to the injection point may be easily calculated by one of ordinary skill in the art. As it is known in the industry, groundwater is flowing at an identifiable rate (typically between 0.1 and 30 feet per day). Additional data which may be considered is the size of the groundwater aquifer. A volume of the oxygen source and pentane are added to the injection point in order to bring the aquifer into the ranges of oxygen and pentane disclosed herein. Specific examples of mixing are provided in the following example section. Thus, the concentration of oxygen and pentane at the contamination site may be in the ranges disclosed herein. The concentration of oxygen may be referred to as the concentration of oxygen, or a value (for example in ppm) related to oxygen. In certain embodiments, regarding the contaminated groundwater, the oxygen may be from about 10 parts per million (ppm) to about 1 ppm. In alternate embodiments, the oxygen may be from about 10 ppm to about 8 ppm. In still other embodiments, the oxygen may be from about 7 ppm to about 4 ppm. In certain embodiments, pentane may be from about 0.800 ppm to about 0.010 ppm. In alternate embodiments, pentane may be from about 0.20 ppm to about 0.019 ppm. In still other embodiments, pentane may be from about 0.019 ppm to about 0.010 ppm. In still other embodiments of the system, the concentrations may be represented by a ratio of oxygen to pentane. In certain embodiments, the ratio of oxygen to the pentane is from about 25:1 to about 200:1. In alternate embodiments, the ratio of the oxygen to the pentane is from about 200:1 to about 75:1. In still other embodiments, the ratio of the oxygen to the pentane is from about 125:1 to about 75:1. Alternatively, the ratio of the oxygen to the pentane may be about 100:1.

By providing the proper amount of an oxygen source and pentane, a variety of contaminants degrade into non-contaminant compositions. Indigenous microorganisms are present in the ground and groundwater capable of being enhanced by this invention. The following article, which is hereby incorporated herein by reference, provides a background of relevant bacteria: *Studies of Naphthalene and Toluene Metabolism in Rhodococcus*, by Lia-Cristina Rodriguez, volume 4, Massachusetts Institute of Technology, 2000. Based upon the presence of the oxygen source and pentane, the microorganisms, or naturally occurring bacteria, degrade the contaminant contained in the ground contamination site. Specifically, the oxygen source, pentane, and nutrients provide an aerobic environment and a food source to enhance the naturally occurring bacterial population. Nutrients may be added, for example, at a carbon: nitrogen: phosphorus ratio of 100:5:1. The nutrients, including nitrogen, phosphorus and micro-nutrients may result in biological enhancement. The definition of an aerobic environment is generally known in the art. For illustration, but not limitation, an environment having dissolved oxygen greater than 2 ppm is an aerobic groundwater environment.

Figure 3:
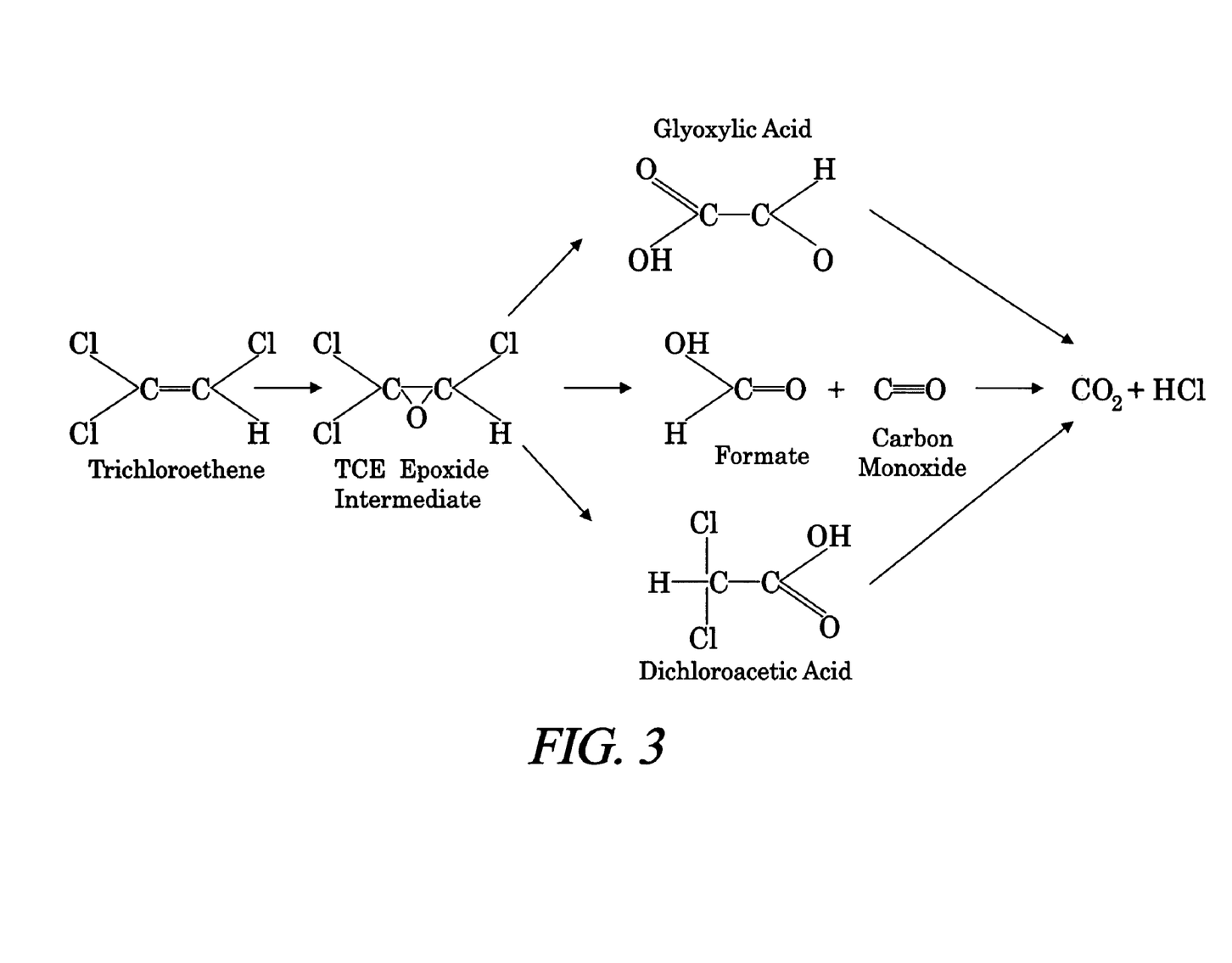
FIG. 3 is flow chart showing a possible degradation pathway for trichloroethene.
Figure 4:
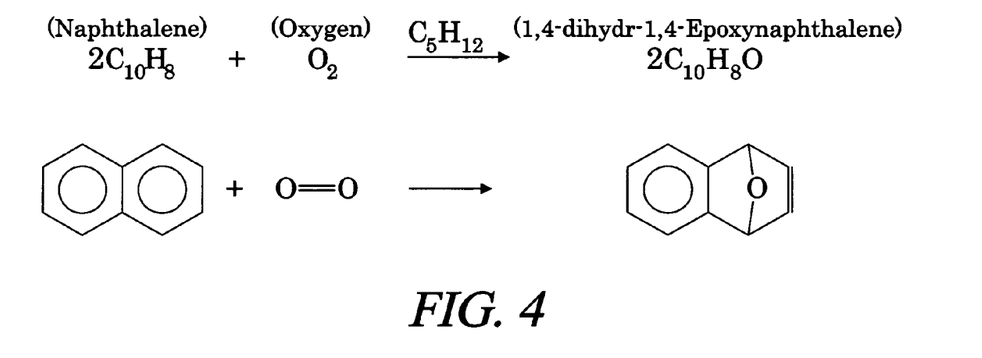
FIG. 4 is a flow chart showing a possible degradation pathway for naphthalene.
Figure 5:
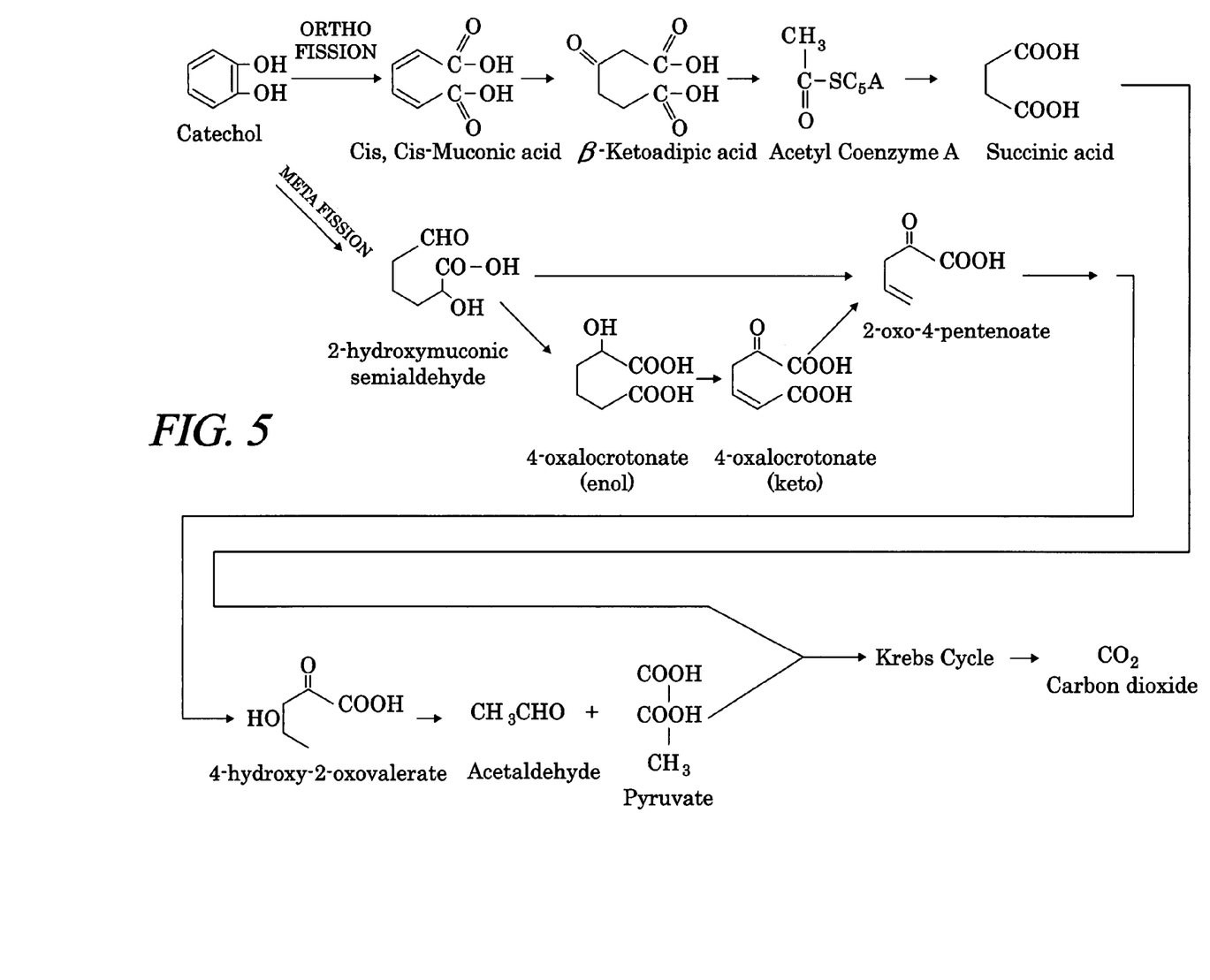
FIG. 5 is a flow chart showing a possible degradation pathway for catechol.

Without being bound by mechanism or theory, in aerobic environments certain microorganisms produce an oxygenase enzyme. This enzyme may react with the carbon double bonds of the contaminants. When the carbon double bond is broken, the resulting chemical structure is subject to further degradation. Without being bound by mechanism or theory, shown in FIGS. 3–5 are aerobic degradation pathways of trichloroethene, naphthalene, and catechol, respectively.

After injecting and delivering the oxygen source and pentane to the ground contamination site, monitoring of the amount of the contaminant occurs. Standard monitoring processes and procedures are used. Briefly, in certain embodiments, conventional wells allow access to a sample. A pump, as described above, pulls the sample from the ground. Analysis of the sample may be provided by a commercial laboratory, such as Lancaster Laboratories of 2425 New Holland Pike, Lancaster, Pa. 17605; TestAmerica Inc. of 2960 Foster Creighton Dr., Nashville, Tenn. 37204; or ELab of Tennessee, LLC of 227 French Landing Dr., Nashville, Tenn. 37228. The frequency of pulling samples is dependant upon many factors, but may, for example, be in the range of daily, weekly, bi-weekly, or monthly. Different contamination (or suspected contamination) may have different sampling and monitoring procedures. The United States Environmental Protection Agency (USEPA) provides analytical and sampling methods that have been evaluated and approved for use. These methods are published in SW-846. More specifically, regarding PAHs: sampling method: 5035, and analysis method: 8270C; regarding chlorinated solvents: sampling method: 5035, and analysis method: 8260B; regarding BTEX: sampling method: 5035, and analysis method: 8260B. These publications are hereby incorporated herein by reference in their entirety. It should be noted that these methods are not necessarily the only methods that could be used for these chemicals. Further, these analytical methods may use specific bottle types and sizes, sampling and bottle filling techniques, storage and refrigeration, etc. to properly control the quality and integrity of the sample.

Figure 6:
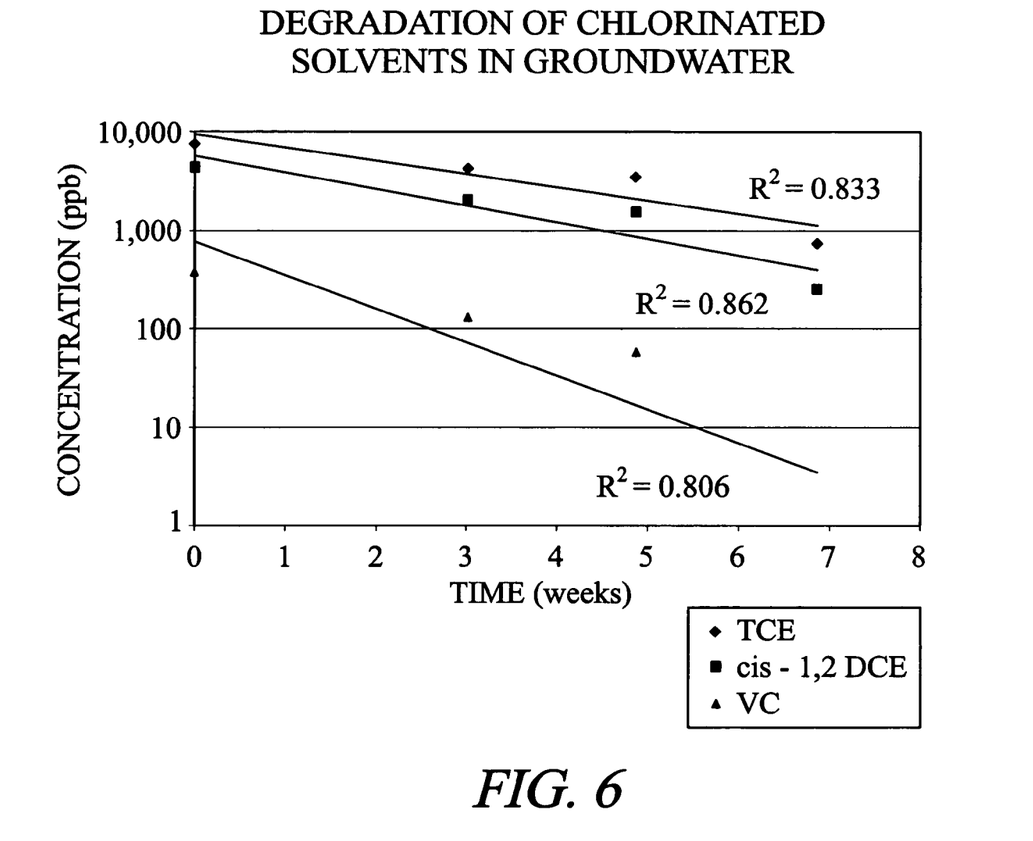
FIG. 6 is a graph showing the degradation of trichloroethylene, cis-1,2 dichloroethylene, and vinyl chloride after treatment. Also shown is $R^2$, which is a goodness of fit measurement in regression analysis. $R^2$ values of 0.5 or higher are good and over 0.9 is even more favorable.
Figure 7:
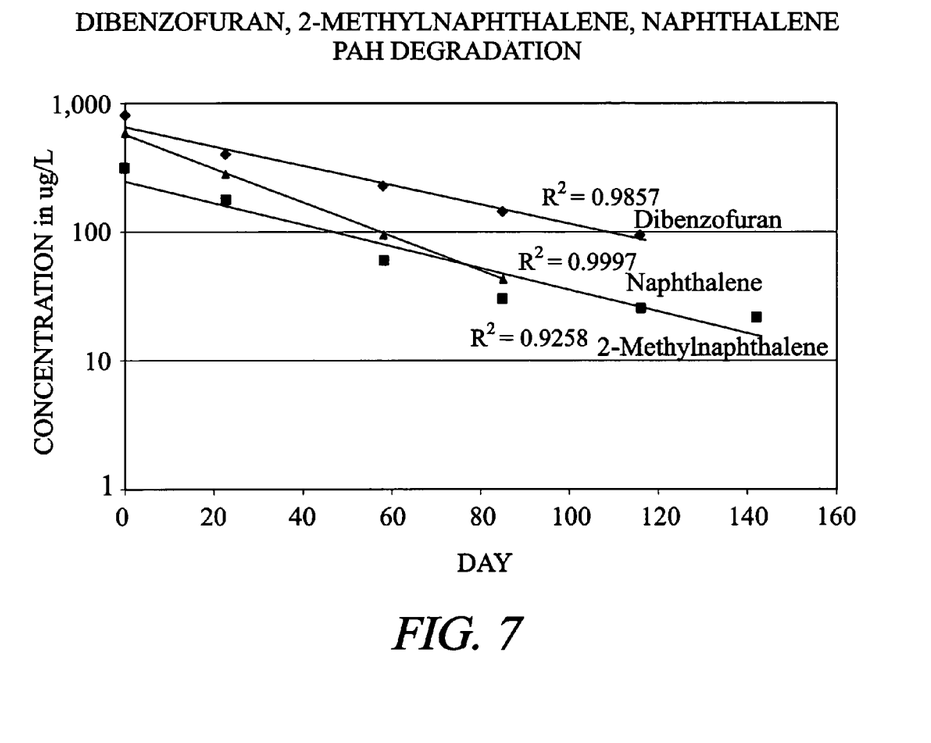
FIG. 7 is a graph showing the degradation of dibenzofuran, 2-methylnaphthalene, and naphthalene after treatment with a ratio of 25:1 of oxygen to pentane.

The remediation system significantly reduces the amount of time required to decontaminate a ground contamination site. Shown in FIG. 6 is the degradation profile of chlorinated solvents, including trichloroethylene, cis-1,2 dichloroethylene, and vinyl chloride. A substantial decline in the amount of the contaminant is provided in a matter of weeks. FIG. 7 shows the reduction in contaminants in a short period of time. Each figure also shows the $R^2$, which is a goodness of fit measurement in regression analysis. $R^2$ values of 0.5 or higher are good and over 0.9 is even more favorable.

Methods of Using the Remediation System

The following example section provides detailed examples of methods to remediate a contaminant. The steps of the methods are briefly discussed here to provide a background to the detailed examples which follow.

Stocks of an oxygen source or pentane may be diluted to a preferred concentration disclosed herein pursuant to standard dilution calculations and by the addition of distilled water. As described above, the volume of the oxygen source or pentane which is injected into the ground at a given injection point is based upon an easy to perform calculation which considers many factors regarding the type of contaminant and specific location of the contaminant. After information is gathered regarding these factors, one of ordinary skill in the art is familiar with the well known calculations to determine the concentration and amount of oxygen source and pentane to be injected into the ground to provide the desired oxygen and pentane concentrations at the contamination site. The same information may be considered to determine the manner and frequency of injection.

As known by one of skill in the art, information must also be gathered regarding the direction and rate of movement of groundwater. Such information is used to properly place the injection and monitoring points, as shown in FIGS. 1 and 2. The equipment needed to set up a monitoring point and obtain samples therefrom has been disclosed above. Additional background information regarding setting up monitoring points and sampling is provided in *The Groundwater Pollution and Hydrology Course*, by John A. Cherry and Robert W. Cleary, Princeton Groundwater Inc., 2004, which is hereby incorporated herein by reference in its entirety. Ordinarily, multiple monitoring wells, or monitoring points, are set up in order to provide a monitor gradient in order to establish levels of contamination within a given area, as shown in FIG. 2.

The frequency of monitoring the amount of a contaminant is dependent upon several factors related to the contaminant, such as the type, amount, and location of the contaminant. An exemplary range of frequencies at which a contaminant may be monitored is between from about once per day to about once per month.

The present invention now will be described with reference to non-limiting examples. The following examples and tables are presented for purposes of illustration only and are not to be construed in a limiting sense.

EXAMPLES

Example 1

Remediation System and Method of Remediation of Perchloroethylene

The following composition of matter is injected into the ground at an injection point and should provide a system for remediation of a contaminant. Two pints of 3% hydrogen peroxide, which is an oxygen source, is placed in a container and is mixed with two liters of 0.03% pentane, which is also a liquid. The two components are mixed manually with four gallons of distilled water. Thus, the liquid mixture should have a concentration of about 750 parts per million of oxygen and about 30 parts per million of pentane.

The liquid mixture described above is injected into the ground at an injection point using a two-inch diameter injection well, which is commercially available from Tri-State. A volume of the liquid mixture, based on aquifer flow, is injected, such as one milliliter per minute for a low hydrolic conductivity aquifer. Before the liquid mixture is injected, monitoring activities are conducted, and additional monitor events are conducted monthly.

In order to obtain a measurement of the perchloroethylene contamination, a bailer is used to remove a sample from the well. Samples are obtained at a frequency of one sample per month. The samples should be sent to Test America Inc., of Nashville, Tenn., or another certified laboratory for chemical analysis regarding the amount of perchloroethylene present.

Example 2

Method of Remediation of a Polycyclic Aromatic Hydrocarbon (PAH)

As described in Example 1, an oxygen source is mixed with pentane and is injected into the ground near the ground contamination site. This is accomplished by adding two pints of 3% hydrogen peroxide to two liters volume of 0.03% pentane. The frequency of injection is one milliliter per minute. The monitoring wells are set up as described in Example 1. In this example, the ratio of the oxygen to the pentane is 25:1. Samples are obtained and are analyzed by a commercial laboratory, as described in Example 1. The degradation profile is shown in FIG. 7.

Example 3

Method of Remediation of Trichloroethylene (TCE)

Into multiple two liter biological oxygen demand (BOD) bottles, are placed two liters of groundwater from a contamination site, having TCE. Into each BOD bottle is placed 0.1 milliliters of 35% hydrogen peroxide and 0.1 microliters of 100% pentane which is mixed with a magnetic stir bar. Accordingly, within each BOD bottle, the oxygen concentration is about 8 ppm and the pentane concentration is about 0.032 ppm. Each BOD bottle is stored in an incubator at 18° C. Samples are pulled once per week. A BOD dissolved oxygen probe is used to determine oxygen concentration. Samples are sent to a commercial laboratory for analysis of TCE amount. The degradation profile is shown in FIG. 6.

This patent application incorporates by reference all references and publications disclosed herein.

Thus, although there have been described particular embodiments of the present invention of a new and useful System and Method of Remediation of Contaminants, it is not intended that such references be construed as limitations upon the scope of this invention except as set forth in the following claims.

TABLE 1

PROPERTIES OF SELECT CHLORINATED ORGANICS.

| CONSTITUENT | FORMULA | M.W. (#/mol) | SOLUBILITY IN WATER at 25° C. (mg/L) |
|---|---|---|---|
| Perchloroethylene[1] | $C_2Cl_4$ | 165.85 | 150 |
| Trichloroethylene[2] | $C_2HCl_3$ | 131.40 | 1,280 |
| 1,2-cis Dichloroethylene[2] | $C_2H_2Cl_2$ | 96.95 | 6,410 |
| 1,2-trans Dichloroethylene[3] | $C_2H_2Cl_2$ | 96.95 | 6,300 |
| Vinyl Chloride[4] | $C_2H_3Cl$ | 62.50 | 8,800 |

NOTES: [1]IARC. Monographs on the Evaluation of the Carcinogenic Risk of Chemicals to Man. Geneva: World Health Organization, International Agency for Research on Cancer, 1972–present, (Multivolume work) p. 492 (1979).
[2]Horvath, A. L., et al; J Phys Chem Ref Data. 28: 449 (1999).
[3]Flick, E. W. Industrial Solvents Handbook. p. 116. 3rd ed. Park Ridge, NJ: Noyes Publications, 1985.
[4]Delassus, P. T., Schmidt, D. D.; J Chem Eng Data. 26: 274–6 (1981).

TABLE 2

PROPERTIES OF SELECT VOLATILE ORGANIC CHEMICALS (BTEX).

| CONSTITUENT | FORMULA | M.W. (#/mol) | SOLUBILITY IN WATER at 25° C. (mg/L) |
|---|---|---|---|
| Benzene[1] | $C_6H_6$ | 78.10 | 1,790 |
| Toluene[2] | $C_7H_8$ | 92.10 | 526 |
| Ethylbenzene[3] | $C_8H_{10}$ | 106.20 | 169 |
| Xylenes | $C_8H_{10}$ | 106.20 | |
| o-xylene isomer[2] | | | 178 |
| p-xylene isomer[4] | | | 198 |
| m-xylene isomer[4] | | | 162 |

NOTES: [1]May, W. E., et al; J Chem Ref Data. 28: 197–0200 (1983).
[2]Sanemasa, I., et al; Bull Chem Soc Japan. 55: 1054–1230 (1982).
[3]Patty, F. (ed.). Industrial Hygiene and Toxicology: Volume II: Toxicology. 2nd ed. New York: Interscience Publishers, 1963. 1223.
[4]Yalkowsky, S. H., Dannenfelser, R. M.; The Aauasol Database of Aqueous Solubility. 5th ed, Tucson, AZ: Univ Az, College of Pharmacy (1992).

TABLE 3

PROPERTIES OF SELECT POLYCYCLIC AROMATIC HYDROCARBONS.

| CONSTITUENT | FORMULA | M.W. (#/mol) | SOLUBILITY IN WATER at 25° C. (mg/L) |
|---|---|---|---|
| 2-Methylnaphthalene[1] | $C_{11}H_{10}$ | 142.20 | 24.6 |
| Naphthalene[2] | $C_{10}H_8$ | 128.17 | 31.0 |
| Acenaphthylene[3] | $C_{12}H_8$ | 152.19 | 16.1 |
| Acenaphthene[4] | $C_{12}H_{10}$ | 154.21 | 3.93 |
| Fluorene[4] | $C_{13}H_{10}$ | 166.22 | 1.90 |
| Phenanthrene[4] | $C_{14}H_{10}$ | 178.23 | 1.18 |
| Anthracene[4] | $C_{14}H_{11}$ | 178.23 | 0.075 |
| Fluoranthene[4] | $C_{16}H_{10}$ | 202.25 | 0.265 |
| Pyrene[4] | $C_{16}H_{11}$ | 202.25 | 0.135 |
| Benzo(a)anthracene[1] | $C_{18}H_{12}$ | 228.29 | 0.00940 |
| Chrysene[1] | $C_{18}H_{13}$ | 228.29 | 0.00189 |
| Benzo(b)fluoranthene[5] | $C_{20}H_{12}$ | 252.31 | 0.00150 |
| Benzo(k)fluoranthene[2] | $C_{20}H_{13}$ | 252.31 | 0.00080 |
| Benzo(a)pyrene[1] | $C_{20}H_{14}$ | 252.31 | 0.00160 |
| Dibenz(a,h)anthracene[1] | $C_{22}H_{14}$ | 278.35 | 0.00060 |
| Benzo(g,h,i)perylene[4] | $C_{22}H_{12}$ | 276.33 | 0.00026 |

NOTES: [1]Yalkowsky, S. H., Dannenfelser, R. M.; The Aquasol Database of Aqueous Solubilitv. Ver 5. Tucson, AZ: Univ AZ, College of Pharmacy (1992).
[2]Pearhnan, R. S., et al; J Chem Ref Data. 13: 555–562 (1984).
[3]Boyd, R H., et al; J Am Chem Soc. 87: 3554–9 (1965).
[4]Mackay, D., Shiu, W. Y.; J Chem Eng Data. 22: 399–402 (1977).
[5]Wise, S. A., et. al., J. Chromatographic Science. 19, 457–465.

What is claimed is:

1. A method of remediation of a contaminant, comprising:
providing an oxygen source;
providing pentane;
injecting the oxygen source and the pentane into the ground, the ground having a ground contamination site;
delivering the oxygen source and the pentane to the ground contamination site; and
monitoring an amount of the contaminant in the ground contamination site,
wherein a ratio of an oxygen to the pentane is from about 25:1 to about 200:1.

2. The method of claim 1, wherein the ratio of the oxygen to the pentane is from about 200:1 to about 75:1.

3. The method of claim 1, wherein the ratio of the oxygen to the pentane is from about 125:1 to about 75:1.

4. The method of claim 1, wherein the ratio of the oxygen to the pentane is about 100:1.

5. The method of claim 4, wherein the oxygen source further comprises hydrogen peroxide.

6. The method of claim 1, wherein the pentane is from about 0.019 ppm to about 0.010 ppm.

7. The method of claim 1, wherein the contaminant is a chlorinated compound.

8. The method of claim 7, further comprising changing the contamination site to an aerobic environment.

9. A method of remediation of a contaminant, comprising:
injecting hydrogen peroxide and pentane into a ground, the ground having a ground contamination site;
delivering the hydrogen peroxide and the pentane to the ground contamination site; and
monitoring an amount of the contaminant in the ground contamination site,
wherein a concentration of oxygen at the ground contamination site is from about 10 ppm to about 1 ppm, wherein a concentration of pentane at the ground contamination site is from about 0.800 ppm to about 0.010 ppm.

10. The method of claim 9, further comprising changing the contamination site to an aerobic environment.

11. The method of claim 10, wherein the contaminant is selected from the group consisting of perchloroethylene, trichloroethylene, cis 1,2-dichloroethylene, trans 1,2-dichloroethylene, vinyl chloride, and polycyclic aromatic hydrocarbons.

12. The method of claim 10, wherein the contaminant is selected from the group consisting of naphthalene, chrysene, pyrene, benzo(a)pyrene, benzene, and toluene.

13. A method of remediation of a contaminant, comprising:
identifying a contamination site;
injecting the oxygen source and the pentane into the ground, the ground having the contamination site;
delivering the oxygen source and the pentane to the contamination site; and
monitoring an amount of the contaminant in the contamination site,
wherein a concentration of an oxygen at the ground contamination site is from about 10 ppm to about 8 ppm, wherein a concentration of pentane at the ground contamination site is from about 0.800 ppm to about 0.010 ppm.

14. The method of claim 13, wherein identifying the contamination site further comprises identifying the contamination site having a concentration of the contaminant in a soluble range of the contaminant.

15. The method of claim 14, wherein identifying the contamination site further comprises identifying the contamination site having the contaminant which is selected from the group consisting of 2-methylnaphthalene, naphthalene, acenaphthylene, acenaphthene, fluorene, phenanthrene, anthracene, fluoranthene, pyrene, benzo(a)anthracene, chrysene, benzo(b)fluoranthene, benzo(k) fluoranthene, benzo(a)pyrene, dibenz(a,h)anthracene, and benzo(g,h,i)perylene.

16. The method of claim 14, wherein identifying the contamination site further comprises identifying the contamination site having a concentration of the contaminant which is selected from the group consisting of perchloroethylene, trichloroethylene, 1,2-cis dichloroethylene, 1,2-trans dichloroethylene, and vinyl chloride.

17. The method of claim 14, wherein identifying the contamination site further comprises identifying the contamination site having a concentration of the contaminant which is selected from the group consisting of benzene, toluene, ethylbenzene, xylenes, o-xylene isomer, p-xylene isomer, and m-xylene isomer.

18. The method of claim 17, wherein the oxygen source further comprises hydrogen peroxide.

* * * * *